United States Patent
Raley et al.

(10) Patent No.: US 8,639,770 B1
(45) Date of Patent: Jan. 28, 2014

(54) SEPARATION OF MUTABLE AND IMMUTABLE DATA IN A MEMORY CACHE FOR IMPROVEMENT OF DATA UPDATES

(75) Inventors: John Raley, San Francisco, CA (US); Ethan Solomita, San Francisco, CA (US); Jessica Jenkins, San Francisco, CA (US)

(73) Assignee: Google Inc., Mountain View, CA (US)

(*) Notice: Subject to any disclaimer, the term of this patent is extended or adjusted under 35 U.S.C. 154(b) by 103 days.

(21) Appl. No.: 13/300,327

(22) Filed: Nov. 18, 2011

(51) Int. Cl.
*G06F 15/167* (2006.01)

(52) U.S. Cl.
USPC .......................................... 709/216; 709/217

(58) Field of Classification Search
USPC ........................... 709/215, 216, 217, 218, 219
See application file for complete search history.

(56) References Cited

U.S. PATENT DOCUMENTS

| | | |
|---|---|---|
| 2006/0288035 A1 | 12/2006 | Viavant |
| 2008/0243847 A1 | 10/2008 | Rasmussen |
| 2009/0198899 A1* | 8/2009 | Revanuru ..................... 711/128 |
| 2011/0196940 A1* | 8/2011 | Martinez et al. ............. 709/217 |

* cited by examiner

*Primary Examiner* — Larry Donaghue
*Assistant Examiner* — Marshall McLeod
(74) *Attorney, Agent, or Firm* — Nelson Mullins Riley & Scarborough LLP

(57) ABSTRACT

A computer-implemented method, system and computer program product for updating a resource in a cached memory storage are provided. Mutable and immutable components of a resource are generated. The mutable component includes metadata that includes the amount of time the resource persists in the cached memory storage. The immutable component of the resource includes content provided by the source of the resource. A key associated with the resource is generated, where the key is used to access the mutable component and the immutable component in the cached memory storage. The key, the mutable component and the immutable component of the resource are transmitted to the cached memory storage from which the resource is retrieved for display on a client device.

20 Claims, 5 Drawing Sheets

SEPARATION OF MUTABLE AND IMMUTABLE DATA IN A MEMORY CACHE FOR IMPROVEMENT OF DATA UPDATES

BACKGROUND

As users browse websites accessible via the Internet or the World Wide Web (or simply the "Web") they download resources onto their computing devices. Those resources may be initially stored on a central server. However, resources that are frequently requested by users are also temporarily stored in a cached memory storage for faster access and download to computing devices.

However, when resources are stored in the cached memory storage, resources require updates from the central server. Sometimes a resource is updated when the content of the resource on the central server changes. Other times, the resource may be updated to extend the time that the resource is stored in the cached memory storage. In this case, even though a metadata portion of the resource actually requires an update, the conventional systems still replace the resource in the cached memory storage with a new resource.

For example, because cached memory storage does not identify different components within the resource, when a metadata portion of the resource requires an update, the entire resource is updated. This causes inefficiencies as the entire resource requires an update, in order to update a metadata portion. This is especially inefficient for example where a metadata portion, such as a header, is updated more often than a content portion, such as a body, and often has a smaller size (i.e., several bytes or more for a header which is smaller compared to a larger byte size of a body).

BRIEF SUMMARY

A computer-implemented method, system and computer program product for updating a resource in a cached memory storage are provided. Mutable and immutable components of a resource are generated. The mutable component includes metadata that includes the amount of time the resource persists in the cached memory storage. The immutable component of the resource includes content provided by the source of the resource. A key associated with the resource is generated, where the key is used to access the mutable component and the immutable component in the cached memory storage. The key, the mutable component and the immutable component of the resource are transmitted to the cached memory storage from which the resource is retrieved for display on a client device.

Further embodiments, features, and advantages of the invention, as well as the structure and operation of the various embodiments of the invention are described in detail below with reference to the accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1:
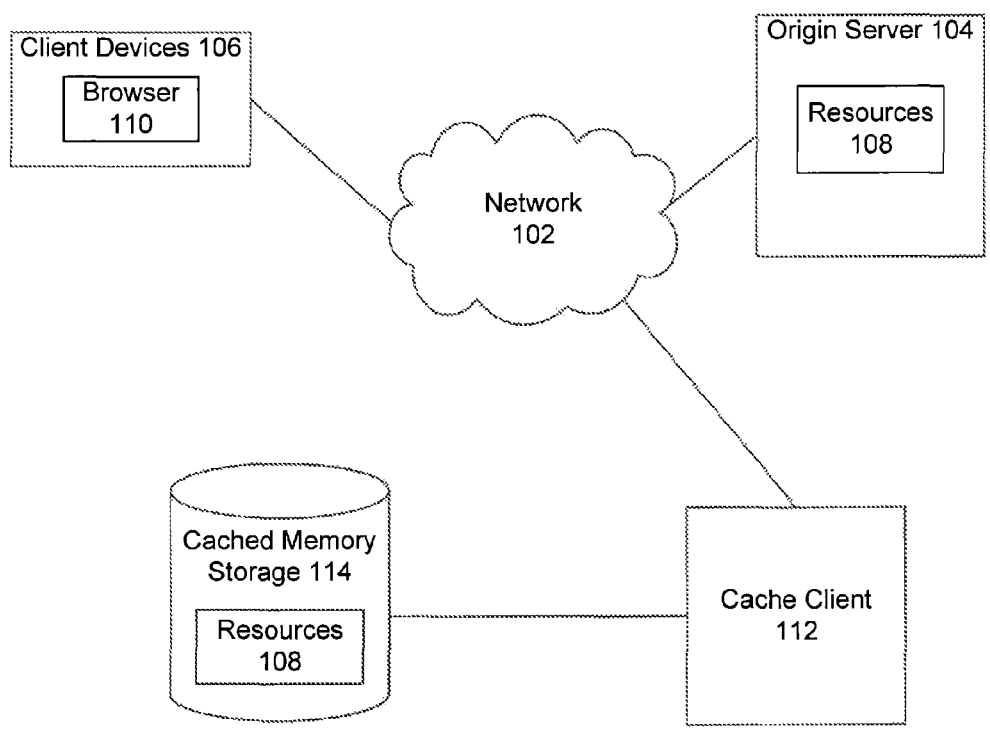
FIG. 1 is a block diagram of a World Wide Web environment, where the embodiments of the invention can be implemented.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

FIG. 1 is a block diagram of a World Wide Web environment 100 (also referred to as Web environment 100) in an embodiment. Web environment 100 includes one or more networks 102, origin servers 104, and client devices 106. Web environment 100 in this embodiment also includes a cache client 112 and cached memory storage 114.

Network 102 may be any network or combination of networks that can carry data communication. Such a network 102 may include, but is not limited to, a local area network, metropolitan area network, and/or wide area network such as the Internet. Network 102 can support technologies including, but not limited to the World Wide Web ("the Web") that provide access to services and applications using protocols, such as a Hypertext Transfer Protocol ("HTTP"). Intermediate web servers, gateways, or other servers may be provided between components of the system shown in FIG. 1, depending upon a particular application or environment.

Origin server 104 is a computing device that hosts multiple resources 108. Origin server 104 may be a web server that transmits resources 108 to client devices 106, described below. Origin server 104 may also transmit resources 108 to other computing devices from which resources 108 may be accessible to client devices 106.

A resource 108 is any data that can be provided over network 102. Resource 108 is identified by a resource address that is associated with resource 108. Resources 108 includes webpages such as HyperText Markup Language (HTML) pages, scripts, word processing documents, portable document format (PDF) documents, images, and video, to name only a few. Resources 108 that display web content are web resources. Resources 108 can also include content, such as words, phrases, images and sounds, that may include embedded information (such as metadata in hyperlinks) and/or embedded instructions (such as JavaScript scripts). When resources 108 are provided using the HTTP protocol, resources 108 typically include an HTTP header and an HTTP body. The HTTP body includes actual content that may be presented for display on client device 106, whereas the HTTP header includes metadata and other information for storing, distributing and processing resource 108.

Client device 106 is an electronic device that is manipulated by a user and is capable of requesting and receiving resources 108 over network 102. Example client devices 106 are personal computers, mobile communication devices, such as smartphones and tablet computers. Client devices 106 typically include an application, such as a web browser (or simply "browser") 110. A user uses browser 110 to request resources 108 over network 102. For example, a user requests resource 108 by typing, selecting or entering an identifier (such as a URL) of a resource stored on origin server 104. In response to a request, origin server 104 transmits resource 108 to client device 106.

Cache client 112 is a computing device that also receives requests for resources 108 from client devices 106. In one embodiment, when cache client 112 receives a request for resource 108, cache client 112 requests resource 108 from origin server 104. Upon receipt, cache client 112 transmits resource 108 to client device 106.

When cache client 112 receives resource 108, cache client 112 also stores resource 108 in cached memory storage 114. Cached memory storage 114 is a data storage on a same or different computing device as cache client 112 that is configured for fast access and retrieval of resources 108. Cached memory storage 114 may be implemented using volatile or non-volatile memory storage, described in detail in FIG. 5. Cached memory storage 114 stores resources 108 that were requested by client devices 106 within a predefined time period. An advantage to storing resources 108 in cached memory storage 114 is that access and retrieval of resources 108 from cached memory storage 114 is faster than the retrieval from origin server 104. For example, cache client 112 may retrieve resources 108 more efficiently from cached memory storage 114 than from origin server 104 as cached memory storage is configured for faster access of resources 108 and stores fewer resources 108.

Unlike conventional systems that store an undivided copy of a resource in the cached memory storage, in a feature here cache client 112 separates resource 108 into mutable and immutable components. Mutable components include metadata and other information that may be updated by computing devices other than origin server 104, such as, for example, cache client 112. In one embodiment, when resource 108 is an HTTP resource, mutable component may include a header of the HTTP resource.

Immutable component of resource 108 includes content that is downloaded and displayed on client device 106. Typically, an immutable component of resource 108 may be modified by the source of resource 108, such as, origin server 104, or may be replaced by origin server 104. The content of the immutable component remains unchanged when it is transmitted for display within Web environment 100.

Inserting Resources into a Cached Memory Storage

Figure 2:
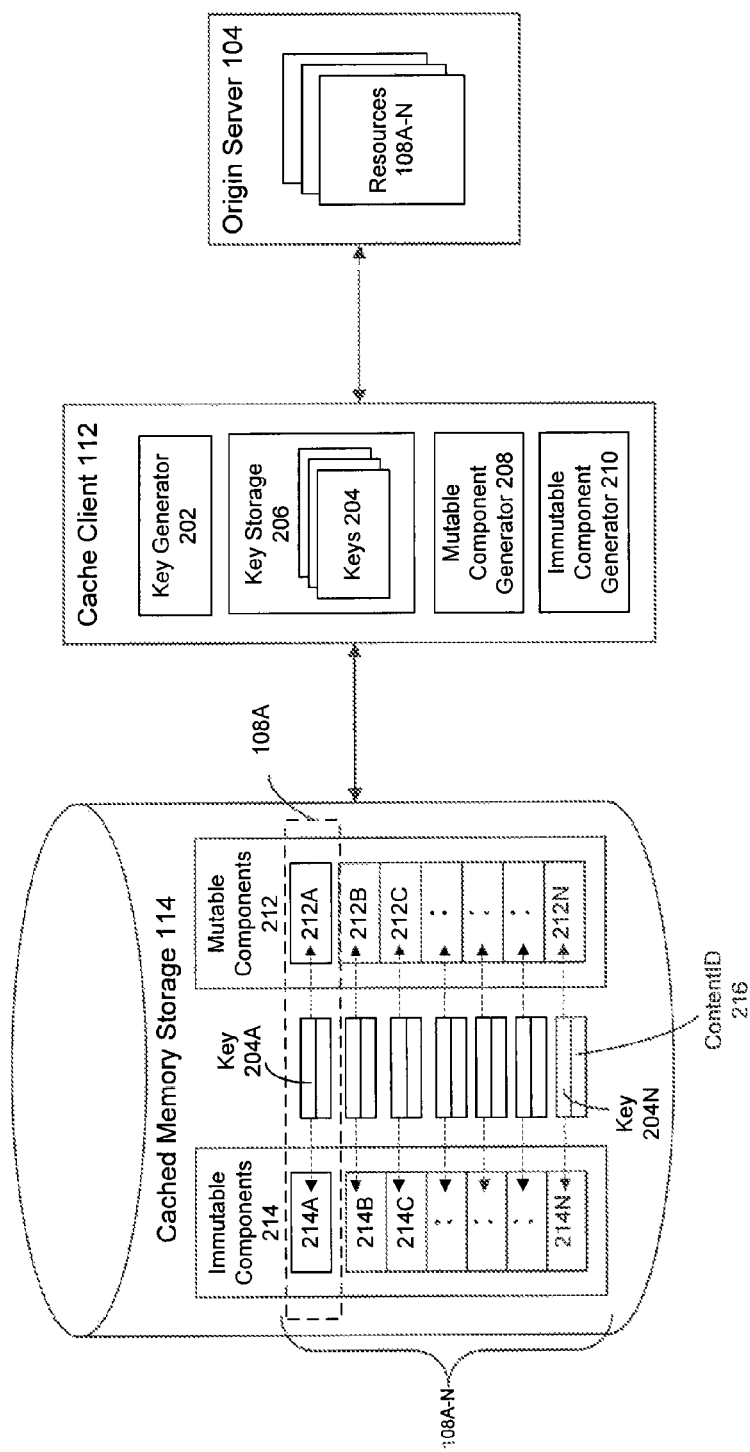
FIG. 2 is a block diagram for storing a resource using mutable and immutable components, according to an embodiment.

FIG. 2 is a block diagram 200 for storing a resource using mutable and immutable components, according to an embodiment.

When cache client 112 receives an initial request for a particular resource 108, cache client 112 requests resource 108 from origin server 104. Upon receipt of resource 108 from origin server 104, cache client 112 stores resource 108 in cached memory storage 114.

To store resource 108 in cached memory storage 114, cache client 112 invokes key generator 202. Key generator 202 generates a key 204 that is associated with resource 108. In one embodiment, key generator 202 generates key 204 using a hash using metadata included in the HTTP header of resource 108.

Key storage 206 stores generated keys 204. Cache client 112 uses keys 204 in key storage 206 to identify a particular key 204 with resource 108 stored in cached memory storage 114, when client device 106 makes a request for a particular resource 108.

Unlike conventional cache clients, cache client 112 includes a mutable component generator 208 and an immutable component generator 210. Mutable component generator 208 receives resource 108 as input, and generates a mutable component 212 of resource 108. Mutable component 212 of resource 108 includes metadata and other information that may be updated by computing devices other than origin server 104. Example mutable component 212 may include an HTTP header of resource 108 whose contents may be updated by cache client 112 of origin server 104. As described herein, metadata includes a creation time, expiration time, etc., of resource 108. Additionally, as mutable component 212 stores metadata associated with resource 108, typically, mutable component 212 is a fraction of the size of the immutable component 214, described below.

Immutable component generator 210 generates immutable component 214 of resource 108. Immutable component 214 of resource 108 includes content that originates on origin server 104 and may be displayed to a user using computing device 106. In one embodiment, immutable component 214 of resource 108 includes an HTTP body of resource 108.

Once cache client 112 generates key 204, mutable component 212 and immutable component 214, cache client 112 transmits the components for storage in cached memory storage 114. Cached memory storage 114 stores mutable component 212 separately from immutable component 212. Both mutable component 212 and immutable component 214 may be accessed using key 204. For example, in block diagram 200, cached memory storage 114 stores resources 108A-N. Cache client 112 partitions those resources 108A-N into mutable components 212A-N and immutable components 214A-N. Each of mutable components 212A-N and immutable components 214A-N may be accessed by corresponding key 204A-N. For example, key 204A accesses mutable component 212A and immutable component 214A. In another example, key 204N accesses mutable component 212N and immutable component 214N, and so forth.

When cached memory storage 114 stores mutable component 212 and immutable component 214 of resource 108, cached memory storage 114 also generates a content identifier (content ID) 216 for each stored resource 108. In an example, this content ID can be a unique value created at the time a respective mutable component 212 and immutable component 214 is inserted into cached memory storage 114. Content ID 216 is associated with mutable component 212. As described below, content ID 216 ensures that a single cache client 112 updates mutable component 212 in cached memory storage 114, when multiple cached clients 112 attempt to update mutable component 212.

Figure 3:
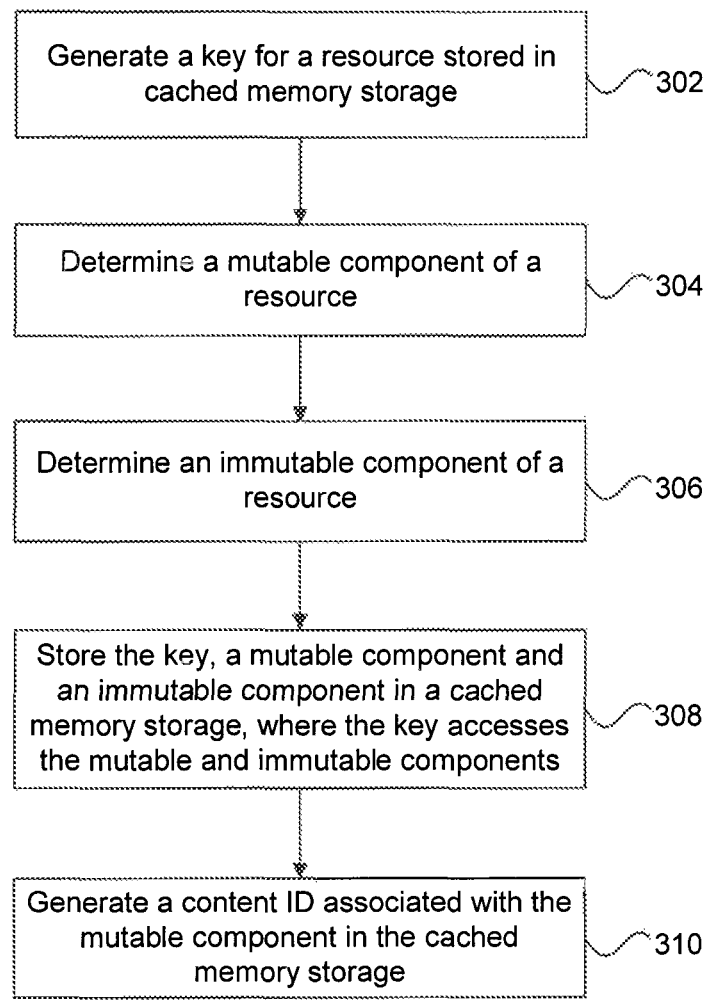
FIG. 3 is a flowchart of a method for storing a resource in a cached memory storage, according to an embodiment.

FIG. 3 is a flowchart 300 of a method for storing a resource, according to an embodiment (stages 302-310). Prior to stage 302, cache client 112 receives resource 108 from origin server 104. As described herein, cache client 112 may receive resource 108 from origin server 104 in response to a request for resource 108 from client device 106. In other words, resource 108 is to be cached by cache client 112.

At stage 302, a key for a resource is generated. When cache client 112 receives resource 108 from origin server 104, cache client 112 generates key 204 that is associated with resource 108. As described herein, key 204 may be a hash of an HTTP header of resource 108, and used to identify resource 108.

At stage 304, a mutable component of a resource is determined. For example, cache client 112 generates mutable component 212 of resource 108. Mutable component 212 may be generated from the HTTP header of resource 108, and may include metadata that is associated with resource 108. As described herein, example metadata includes an expiration time of resource 108 in cached memory storage 114.

At stage 306, an immutable component of a resource is determined. For example, cache client 112 generates immutable component 214 of resource 108. Immutable component 214 may be generated from the HTTP body of resource 108, and may include content that originates on origin server 104 and is displayed on client device 106.

At stage 308, the key, mutable component, and immutable component generated and determined in steps 302-306 are stored. For example, key 204, mutable component 212 and immutable component 214 of resource 108 are transmitted to cached memory storage 114. As described herein, when stored, mutable component 212 and immutable component 214 are accessible using key 204.

At stage 310, a content identifier (ID) is generated. When resource 108 is stored in cached memory storage 114 as mutable component 212 and immutable component 214, content ID 216 is generated. As described herein, a content ID 216 is associated with a respective mutable component 212 and ensures that mutable component 212 is updated by a particular cache client 112 when multiple cache clients 112 attempt to update the same mutable component 212, as explained further below.

Updating Resources in Cached Memory Storage

Going back to FIG. 2, cached memory storage 114 stores resources 108 for efficient access and download to client devices 106. Thus, typically, resources 108 that are stored in cached memory storage 114 are resources 108 that are frequently accessed by client devices 106. When resources 108 become obsolete, they are replaced by newer resources 108.

To ensure that resources 108 do not persist in cached memory storage 114 indefinitely, origin server 104 periodically validates resources 108 in cached memory storage 114. In one embodiment, validation may occur when client device 106 requests resources 108. In another embodiment, validation may occur at predefined time intervals, such as every hour, once a day, once a week, etc., when cache client 112 validates resources 108 in cached memory storage 114.

To trigger validation, origin server 104 includes metadata in, for example, HTTP header of resource 108. In one embodiment, the trigger may be an expiration date or time beyond which resource 108 becomes obsolete in cached memory storage 114. When cache client 112 requests resource 108 from cached memory storage 114 that falls within a preconfigured time range of the expiration date or time, or is past the expiration date or time, cache client 112 validates resource 108 with origin server 104. As described below, origin server 104 may validate resource 108 such that resource 108 remains in cached memory storage 114 for a time set by origin server 104, inserts a new resource 108, or removes resource 108.

In one embodiment, when cache client 112 requests resource 108 associated with particular key 204 from cached memory storage 114, cache client 112 retrieves key 204, mutable component 212, and content ID 216. Upon receipt, cache client 112 checks the metadata in mutable component 212 and determines whether resource 108 requires validation. If resource 108 requires validation, cache client 112 transmits a validation request to origin server 104. In an embodiment, a validation request includes metadata stored in the HTTP header of resource 108 that is included in mutable component 212.

When origin server 104 receives a validation request, origin server 104 determines whether resource 108 should be stored in cached memory storage 114. When origin server 104 determines that cache client 112 may continue to provide resource 108 from cached memory storage 114 to client devices 106, origin server 104 generates new metadata that includes a new expiration date and time for resource 108. This new expiration date and time is then transmitted to cache client 112. In an embodiment, the new expiration date and time may be generated as part of a new HTTP header for resource 108.

At cache client 112, mutable component generator 208 generates a new mutable component 212 associated with key 204 for resource 108. The new mutable component 212 and key 204 are then transmitted to cached memory storage 114, where the new mutable component replaces the existing mutable component 212. The immutable component 214, however, is not replaced. In an embodiment, when cache client 112 updates mutable component 212, cached memory storage 114 also generates a new content ID 216 that is associated with the new mutable component 212.

It is important to note that this process for updating resources 108 in cached memory storage 114 is different from conventional approaches. Conventional approaches do not store resources as mutable and immutable components, but instead associate a key with the entire stored resource. Thus, when any portion of a resource is updated, even when the portion is several bytes, the entire resource requires an update. As a result, when a server, in a conventional approach, determines to persist the resource in a cached memory storage, a conventional cache client replaces the entire resource in the cached memory storage in order to update the expiration date and time component of a resource.

In an embodiment, when cache client 112 validates resource 108, cache client 112 retrieves content ID 216 from cached memory storage 114. Content ID 216 synchronizes the updates of mutable components 212 of resource 108 when they are updated using multiple cache clients 112. For example, when multiple cache clients 112 attempt to update mutable component 212 of resource 108, content ID 216 ensures that one cache client 112 will succeed. When multiple cache clients 112 request mutable component 212 for resource 108, content ID 216 is also provided to each cache client 112. Cache client 112 that validates resource 108 with origin server 104 may, then, update cached memory storage 114 with a new mutable component 212. To update cached memory storage 114, content ID 216 that is associated with mutable component 212 and immutable component 214 must match with content ID 216 that is provided to cache client 112. When cached memory storage 114 is updated with new mutable component 212, cached memory storage 114 updates content ID 216 that is associated with mutable component 212. Thus, when the remaining slower cache clients 112 attempt to update mutable component 212 of the same resource 108, the update will fail and conflicts are avoided because the new content ID 216 that is associated with new mutable component 212 does not match content ID 216 that was provided to the remaining cache clients 112. In this case, a cache client 112 that failed to update mutable component 212 may re-request resource 108 from cached memory storage 114 and determine whether another update is required.

When origin server 104 determines that resource 108 is obsolete, origin server 104 may update resource 108. When origin server 104 updates resource 108, the updated resource 108 is inserted into cached memory storage 114 as a new resource 108, as described in FIG. 3. When origin server 104 does not update resource 108, cache client 112 may also delete resource 108 (and its components, such as key 204, mutable component 212, and immutable component 214)

from cached memory storage 114, in a manner that is known to a person skilled in the relevant art.

Figure 4:
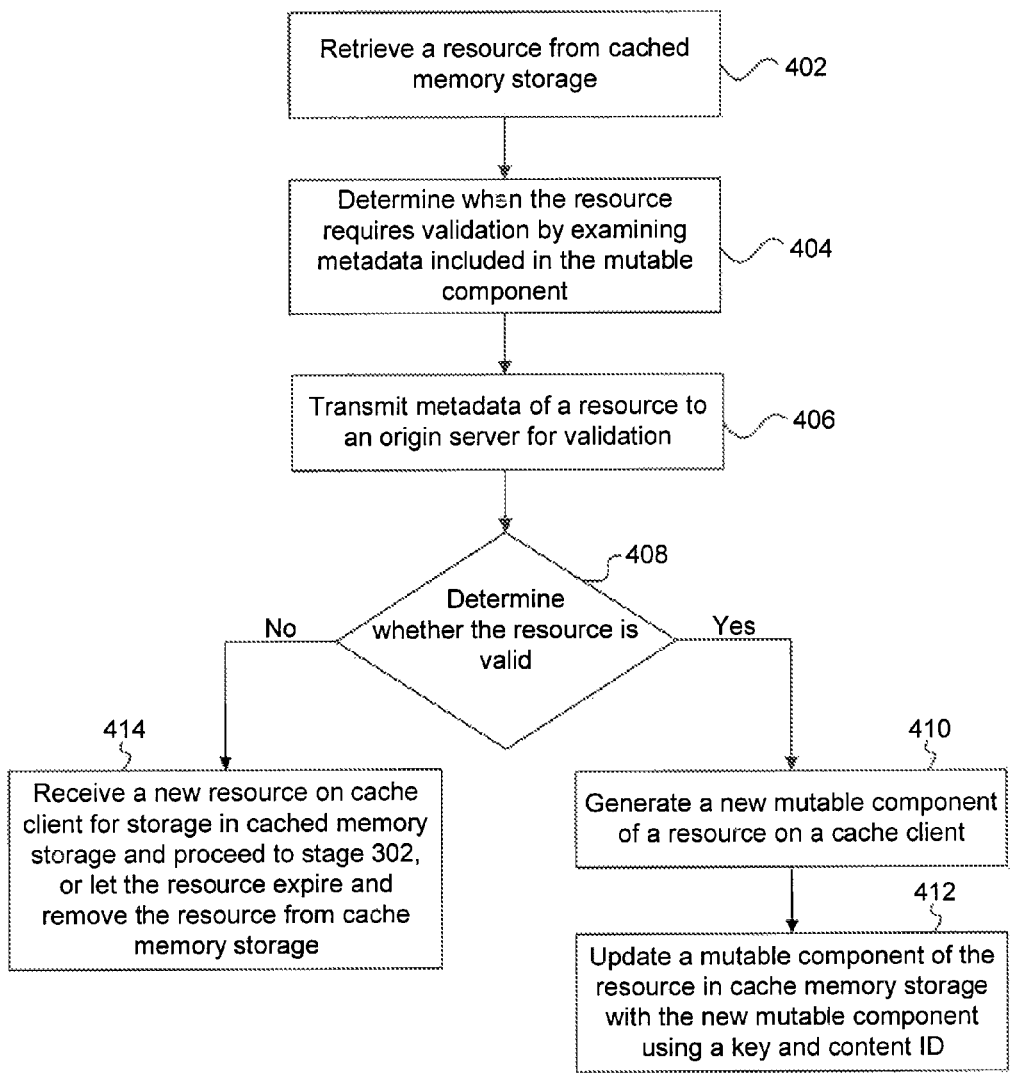
FIG. 4 is a flowchart of a method for updating a resource in a cached memory storage, according to an embodiment.

FIG. 4 is a flowchart 400 of a method for updating a resource, according to an embodiment (stages 402-414). A resource 108 may be updated when cache client 112 requests resource 108 from cached memory storage 114.

At stage 402, a mutable component of a resource is retrieved. For example, cache client 112 may request resource 108 using key 204 from cached memory storage 114. In response to the request, cached memory storage 114 may provide mutable component 212 of resource 108 to cache client 112. In an embodiment, cached memory storage 114 may also provide key 204, immutable component 214, and content ID 216 of resource 108 to cache client 112.

At stage 404, whether a resource requires validation is determined. When resource 108 is received on cache client 112, cache client 112 determines whether resource 108 requires validation. As described herein, resource 108 may require validation when the metadata within mutable component 212 indicates that the expiration date and time set by origin server 104 has expired. When resource 108 requires validation, the flowchart proceeds to stage 406, otherwise the flowchart ends.

At stage 406, a resource is transmitted for validation. When resource 108 requires validation, cache client 112 transmits a portion of metadata included in mutable component 212 to origin server 104. Upon receipt, origin server 104 either validates resource 108 and issues new validation credentials, or allows resource 108 to expire. The result of whether resource 108 was validated are transmitted to cache client 112.

At stage 408, a determination is made as to whether a resource 108 was validated. When origin server 104 validates resource 108, flowchart proceeds to stage 410. Otherwise, flowchart proceeds to stage 414.

At stage 410, a new mutable component is generated. When origin server 104 validates resource 108, origin server 104 includes new metadata for resource 108. Cache client 112 uses the new metadata to generate a new mutable component 212 for resource 108.

At stage 412, a resource is updated with new mutable component 212. For example, cache client 112 transmits key 204 and new mutable component 212 to cached memory storage 114, where the new mutable component 212 replaces the existing mutable component 212. In an embodiment, cache client 112 also transmits a content ID 216 associated with mutable component 212 to ensure that mutable component 212 is updated without conflicts when multiple cache clients 112 attempt to update mutable component 212. In this embodiment, once the new mutable component 212 is updated in cached memory storage 114, cached memory storage 114 generates a new content ID 216 for resource 108. This prevents multiple cache clients 112 from updating cached memory storage 114 with a new mutable component 212 once mutable component 212 was updated by a single cache client 112. For example, when multiple cache clients 112 attempt to validate the same mutable component 212 using content ID 216 retrieved in stage 402, a single cache client 112 may successfully update mutable component 212 with the new mutable component 212. The remaining cache clients 112 may fail as content ID 216 retrieved in stage 402 will not match to the newly generated content ID 216.

At stage 414, a resource is replaced when it is no longer validated. In one embodiment, origin server 104 may provide cache client 112 with a new resource 108. Cache client 112 then generates a new mutable and immutable components and inserts them into cached memory storage as described in FIG. 3. In another embodiment, cache client 112 may remove resource 108 from cached memory storage 114.

Figure 5:
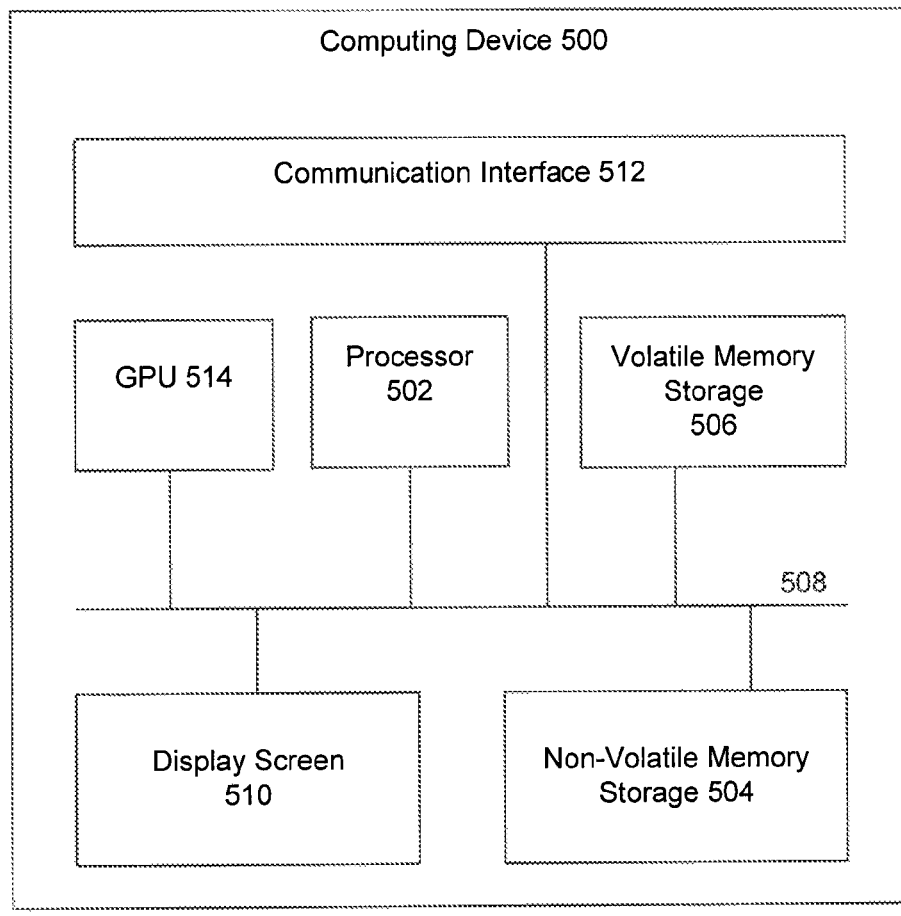
FIG. 5 is a block diagram of a computer system in which embodiments of the invention can be implemented.

FIG. 5 is an example computer system 500 in which embodiments of the present invention, or portions thereof, may be implemented as computer-readable code. For example, the components or modules of Web environment 100, such as cache client 112, key generator 202, mutable component generator 208, immutable component generator 210, etc., may be implemented in one or more computer systems 500 using hardware, software, firmware, tangible computer-readable media having instructions stored thereon, or a combination thereof and may be implemented in one or more computer systems or other processing systems. Modules and components in FIGS. 1-4 may be embodied in hardware, software, or any combination thereof.

Client device 106, origin server 104, and other devices in Web environment 100 may include one or more computing devices. Those computing devices may include one or more processors 502, one or more non-volatile storage mediums 504, one or more memory devices 506, a communication infrastructure 508, a display screen 510 and a communication interface 512.

Processors 502 may include any conventional or special purpose processor, including, but not limited to, digital signal processor (DSP), field programmable gate array (FPGA), and application specific integrated circuit (ASIC).

GPU 514 is a specialized processor that executes instructions and programs, selected for complex graphics and mathematical operations, in parallel.

Non-volatile storage 504 may include one or more of a hard disk drive, flash memory, and like devices that may store computer program instructions and data on computer-readable media. One or more of non-volatile storage device 504 may be a removable storage device.

Memory devices 506 may include one or more volatile memory devices such as but not limited to, random access memory. Communication infrastructure 508 may include one or more device interconnection buses such as Ethernet, Peripheral Component Interconnect (PCI), and the like.

Typically, computer instructions are executed using one or more processors 502 and one or more GPUs 514. Computer instructions can be stored in non-volatile storage medium 504 or memory devices 506. Computer instructions may be stored on a computing device in a compiled file, an executable file or a dynamically linked libraries or objects. Computer instructions may also be compiled on a computing device prior to execution or interpreted on the computing device. In a non-limiting example, computer instructions may be included in a routine, a subroutine, or layers of a software stack that are manipulated by processors 502 or GPUs 514.

Display screen 510 allows results of the computer operations to be displayed to a user or an application developer.

Communication interface 512 allows software and data to be transferred between computer system 500 and external devices. Communication interface 512 may include a modem, a network interface (such as an Ethernet card), a communications port, a PCMCIA slot and card, or the like. Software and data transferred via communication interface 512 may be in the form of signals, which may be electronic, electromagnetic, optical, or other signals capable of being received by communication interface 512. These signals may be provided to communication interface 512 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for updating a resource in a cached memory storage, comprising:
   generating a mutable component and immutable component of the resource provided over a network;
   generating a key associated with the resource, wherein the key can be used to separately access the mutable component and the immutable component of the resource in the cached memory storage;
   transmitting the key, the mutable component and the immutable component of the resource to the cached memory storage, whereby the resource may be retrieved from the cached memory storage for display on a client device;
   updating the mutable component separately from the immutable component;
   retrieving the mutable component of the resource from the cached memory storage;
   determining, using the mutable component, when the resource requires validation; and
   validating the resource based on the determining, wherein the validating replaces metadata included in the mutable component when the metadata indicates that the resource is obsolete.

2. The computer-implemented method of claim 1, wherein the resource is an HTTP resource.

3. The computer-implemented method of claim 1, wherein the metadata includes the amount of time the resource persists in the cached memory storage.

4. The computer-implemented method of claim 1, wherein the immutable component includes content that is generated by a source of the resource.

5. The computer-implemented method of claim 1, wherein the resource includes an HTTP header having the metadata.

6. The computer-implemented method of claim 1, wherein the resource includes an HTTP body with content and the immutable component includes the content for display on the client device.

7. The computer-implemented method of claim 1, further comprising:
   generating a content identifier (content ID) associated with the mutable component of the resource, wherein the contend ID eliminates conflicts for updating the mutable component in the cached memory storage when multiple computing devices attempt to update the same mutable component in cached memory storage.

8. The computer-implemented method of claim 1, wherein validating replaces the metadata included in the mutable component when the metadata indicates that the resource is within a pre-configured time range before becoming obsolete.

9. The computer-implemented method of claim 1, wherein validating further comprises:
   transmitting a validation request to a source of the resource, wherein the source determines if the immutable component of the resource is valid;
   receiving a validation response, the validation response including metadata indicating the new time that the resource persists in the cached memory storage;
   generating a new mutable component using the metadata included in the validation response; and
   updating, using the key, the mutable component of the resource in the cached memory storage with the new mutable component.

10. A cache client for updating a resource in a cached memory storage, comprising:
   a mutable component generator configured to generate a mutable component of the resource provided over a network;
   an immutable component generator configured to generate an immutable component of the resource; and
   a key generator configured to generate a key associated with the resource, wherein the key can be used to separately access the mutable component and the immutable component in the cached memory storage;
   a communication interface configured to transmit the key, the mutable component and the immutable component of the resource to the cached memory storage, whereby the resource may be retrieved from the cached memory storage for display on a client device; and
   the cache client further configured to:
      update the mutable component separately from the immutable component;
      retrieve the mutable component of the resource form the cached memory storage;
      determine, using the mutable component, when the resource requires validation; and
      when the resource requires validation, the cache client is further configured to transmit metadata included in the mutable component for validation to the origin server, wherein the origin server replaces the metadata included in the mutable component when the metadata indicates that the resource is obsolete.

11. The system of claim 10, wherein the resource is an HTTP resource.

12. The system of claim 10, wherein the metadata includes the amount of time the resource persists in the cached memory storage.

13. The system of claim 12, wherein the metadata includes an expiration time of the resource store in the cached memory storage.

14. The system of claim 12, further comprising an origin server for generating the immutable component.

15. The system of claim 10, wherein the resource includes an HTTP header having metadata and the mutable component include the metadata.

16. The system of claim 10, wherein the resource includes an HTTP body with content and the immutable component includes the content for display on the client device.

17. The system of claim 10, further comprising:
the cached memory storage configured to generate a content identifier (content ID) associated with the mutable component of the resource, wherein the contend ID eliminates conflicts for updating the mutable component in the cached memory storage when multiple computing devices attempt to update the same mutable component of the resource in cached memory storage.

18. The system of claim 10, wherein the cache client is further configured to:
transmit a validation request to a source of the resource, wherein the source determines if the immutable component of the resource is valid;
receive a validation response, the validation response including metadata indicating the new time that the resource persists in the cached memory storage;
generate, using a mutable component generator, a new mutable component using the metadata included in the validation response; and
update, using the key, the mutable component of the resource in the cached memory storage with the new mutable component.

19. An article of manufacture including a non-transitory computer-readable medium having instructions retrieved thereon that, when executed by a computing device, cause the computing device to perform operations for updating a resource in a cached memory storage, the operations comprising:
generating a mutable component and immutable component of the resource provided over a network, wherein the mutable component includes metadata associated with the resource, wherein the metadata includes the amount of time the resource persists in a cached memory storage, and wherein the immutable component includes content that is generated by a source of the resource;
generating a key associated with the resource, wherein the key can be used to separately access the mutable component and the immutable component in the cached memory storage;
transmitting the key, the mutable component and the immutable component of the resource to the cached memory storage, whereby the resource may be retrieved from the cached memory storage for display on a client device;
updating the mutable component separately from the immutable component;
retrieving the mutable component of the resource from the cached memory storage;
determining, using the mutable component, when the resource requires validation; and
validating the resource based on the determining, wherein the validating replaces the metadata included in the mutable component when the metadata indicates that the resource is obsolete.

20. The non-transitory computer-readable medium of claim 19, having instructions retrieved thereon that, when executed by the computing device, cause the computing device to further perform operations comprising:
transmitting a request to a source of the resource for validation, wherein the source determines if the immutable component of the resource is valid;
receiving a validation response, the validation response including metadata indicating the new time that the resource persists in the cached memory storage;
generating a new mutable component using the metadata included in the validation response; and
updating, using the key, the mutable component of the resource in the cached memory storage with the new mutable component.

* * * * *